May 8, 1956     T. J. WOOD, JR     2,745,078
DETACHABLE ELECTRIC CIRCUIT CONNECTING DEVICE
HAVING CONDUCTOR SHEATH PENETRATING MEANS
Filed Nov. 20, 1953     2 Sheets-Sheet 1

INVENTOR.
THOMAS J. WOOD JR.
BY
Geo. B. Pittle
ATTORNEY

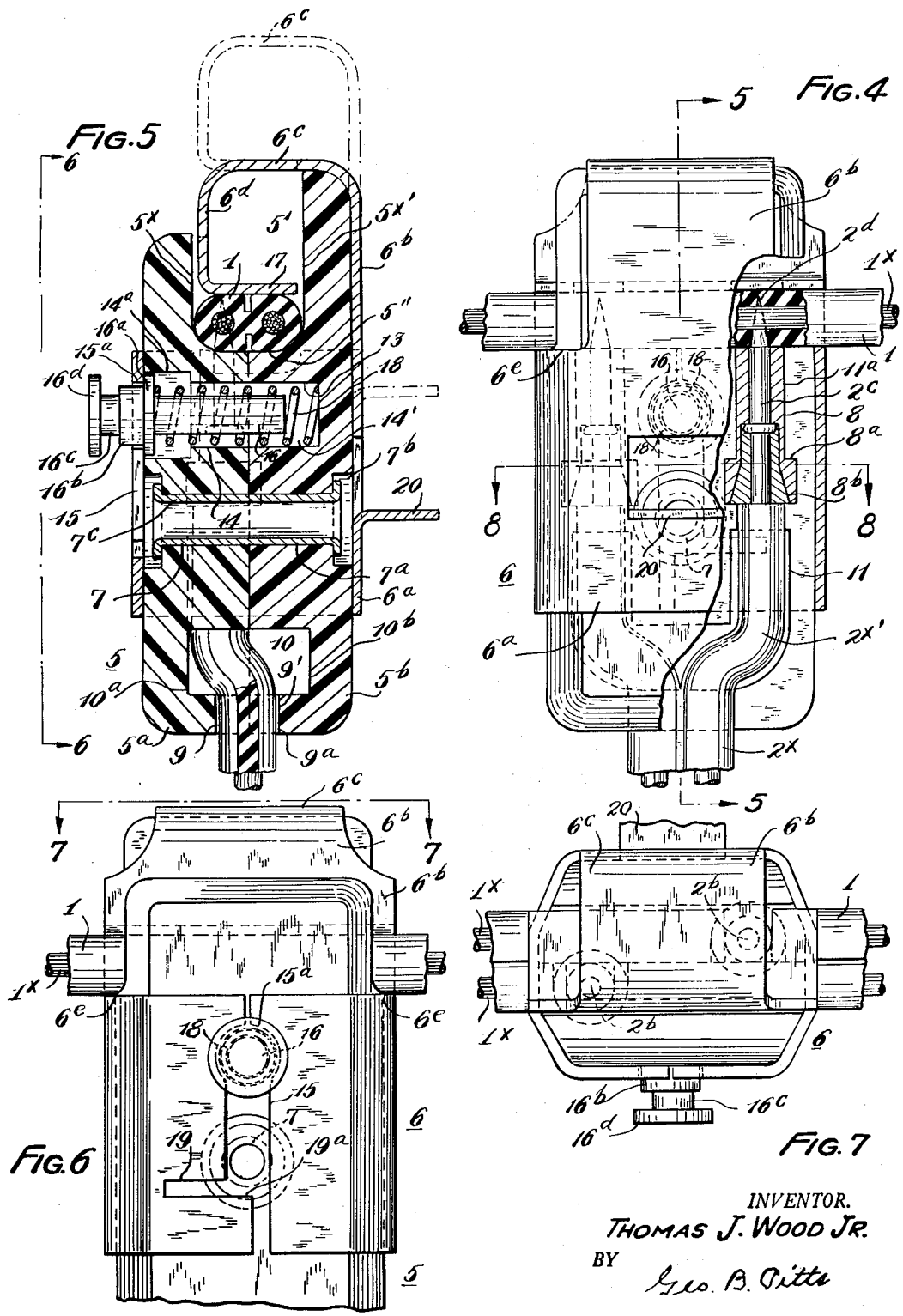

United States Patent Office 2,745,078
Patented May 8, 1956

2,745,078

DETACHABLE ELECTRIC CIRCUIT CONNECTING DEVICE HAVING CONDUCTOR SHEATH PENETRATING MEANS

Thomas J. Wood, Jr., Mayfield Heights, Ohio

Application November 20, 1953, Serial No. 393,286

7 Claims. (Cl. 339—99)

This invention relates to an improved device for detachably connecting the latter at selected positions to the wires of an electric circuit disposed within suitable insulating material forming an elongated cable (hereinafter referred to as a main cable), for providing a branch circuit, the outer ends of the leads of the latter being adapted to be connected in a well known manner to an electrically operated mechanism, an illuminating fixture or to the socket for an electric bulb, as herein shown for exemplification purposes. Such device is advantageous where the mechanism or fixture is portable and is adapted to meet various conditions; for example, by means of a separate device the latter may be connected to the leads of a branch circuit, thereby providing one or more separate branch circuits.

Heretofore, according to my knowledge, the main cable was provided with one or more spaced plug-in members, each enclosing a section of the wires within the cable, the walls of each member being formed with a plurality of pairs of plug-in openings adapted to receive the electric terminals of conventional plugs. In this form of construction the cable, prior to use, had to be provided with these plug-in members and sufficient number thereof provided, whereby branch circuits could be provided at convenient positions.

The device embodying my invention is connected to the inner ends of leads for a branch circuit and is (a) applied to a conventional type of cable to make direct connection between its leads and the respective wires in the cable, so that the provision in the main cable of switches, plug-in members and/or other forms of connections are totally eliminated, and therefore avoids the use of specially constructed cables and (b) may be disconnected from the cable without affecting the insulation material thereof.

One application of the invention, as shown, consists in providing branch circuits for electric bulbs which may be mounted on a Christmas tree for illuminated decorative purposes.

The device consists of a body formed of non-conducting material and enclosing electric terminals of lead-in-wires, a recess to removably accommodate a portion of the main cable and a reciprocable member adapted to apply pressure to the cable to effect contact of the terminals with the wires within the cable. The invention also includes means for releasably maintaining the cable in position with the wires therein in electrical contact with the terminals.

One object of the invention is to provide an improved device of the character referred to having lead-in wires for a branch electric circuit connected to terminals the outer ends of which are pointed and adapted to penetrate the insulating material of a cable and engage the wires in the latter.

Another object of the invention is to provide an improved electric circuit connecting device having terminals connected to lead-in wires, a recess to accommodate a portion of an elongated current supply cable and means for effecting contact of the wires in the cable with the terminals.

Another object of the invention is to provide an improved electric circuit connecting device, which is adapted to receive a portion of an electric current supply cable, having terminals for readily engaging the wires in the cable and releasable means for maintaining the wires in the cable in electrical contact with the terminals.

Another object of the invention is to provide an improved electric current connecting device for engaging the wires in a cable, to provide a branch circuit, whereby switches or other electric connections in the cable are eliminated.

Another object of the invention is to provide a device of this type consisting of two main slidably related parts, the relative movement of which in one direction effects engagement of the terminals in one part with the wires in a cable and relative movement of the parts in the opposite direction automatically effects disengagement of the wires in the cable from the terminals.

Another object of the invention is to provide an improved device of this type of simplified form of construction capable of ready attachment to an electric current supply cable and detachment therefrom without affecting the insulating characteristics of the cable.

Other objects and advantages of the invention will be apparent to those skilled in the art to which my invention relates from the following description taken in connection with the accompanying drawings, wherein Fig. 1 is an elevational view showing diagrammatically a Christmas tree supporting a main cable to which are connected a plurality of branch circuits leading to electric bulbs, each circuit being connected to the main cable by a device embodying my invention;

Fig. 4 is an enlarged elevational view of parts shown in Fig. 2, parts being broken away to facilitate the illustration;

Fig. 5 is a section on the line 5—5 of Fig. 4;

Fig. 6 is a front elevational view on the line 6—6 of Fig. 5;

Fig. 7 is a top plan view on the line 7—7 of Fig. 6; and

Figure 1:
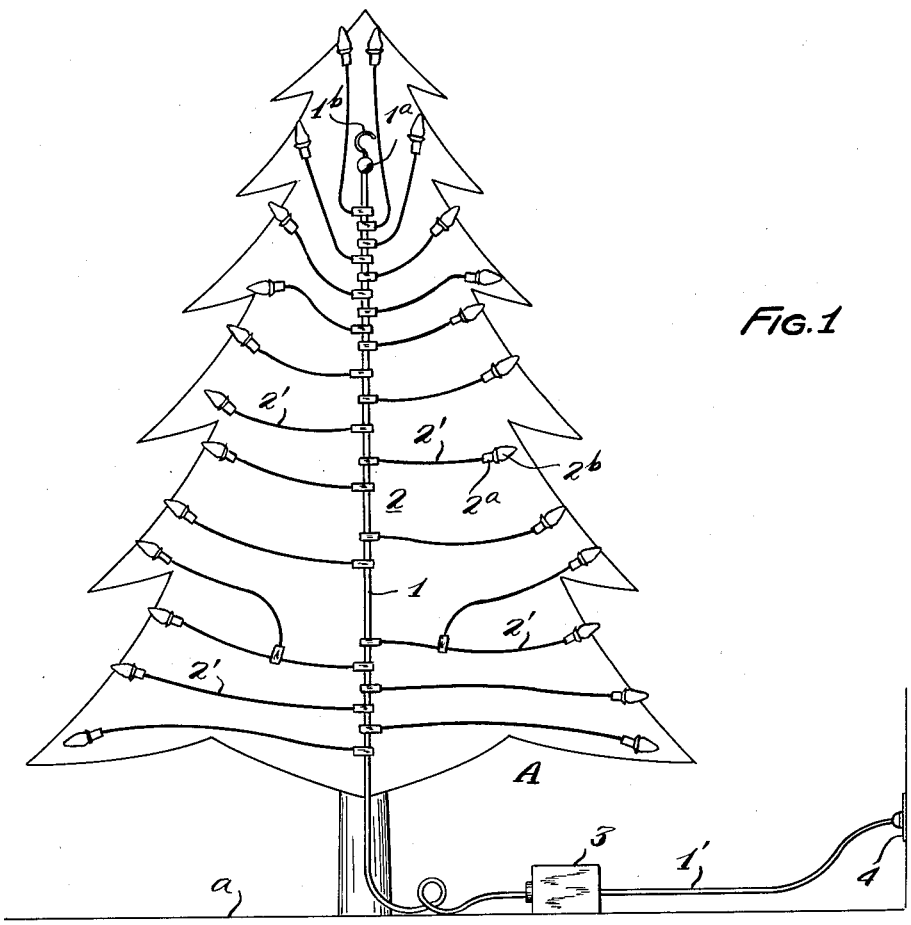
Figure 2:
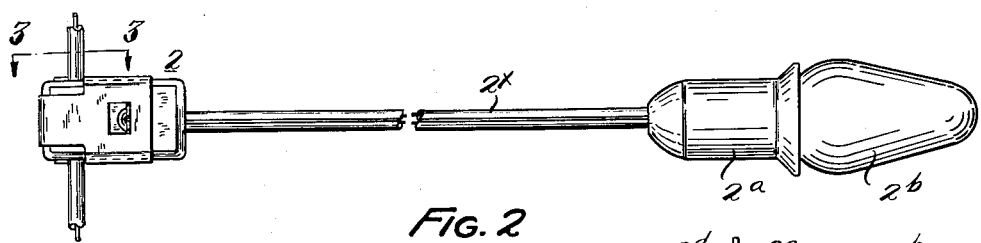
Fig. 2 is an enlarged view showing the connection of a branch circuit to the main cable.

In the drawings, Fig. 1 indicates a conventional type of electric current supply cable adapted to be connected to a current supply source and supply current for various uses; in such an arrangement a connecting device, indicated as an entirety at 2, may be connected at any desirable point along the cable to provide a branch circuit 2' leading therefrom. In the illustrated application of my invention, (a) the cable 1 extends to the upper end portion of a Christmas tree, shown diagramatically at A, and is suspended therefrom, the tree being supported in a suitable manner (not shown) on a surface or floor a and (b) each branch circuit 2' shown thereon terminating in a socket 2a for an electric bulb or lamp 2b. The outer end of the cable 1 is connected to an element 1a formed of suitable insulation material, the element 1a in turn being provided with a member 1b (such as a hook) adapted to be connected to an upper part of the tree A. The cable 1 extends to a transformer 3 and the latter is connected by a cable 1' to a plug-in outlet 4. Where a 115 volt C—7½ circuit is used the transformer 3 is omitted. The current conducting wires 1x within the cable 1 are respectively formed of small wires in close contact relation, as shown in Fig. 5, to insure positive electrical contact therewith when the device 2 is connected to the cable 1.

The device 2 comprises a body member 5 formed of suitable non-conducting material—preferably a suitable plastic which can be molded—and a member 6 surrounding and movably engaging the outer walls of the body member 5, for a purpose later set forth. The body member 5 preferably consists of two face-to-face parts 5a, 5b, which are connected together in fixed relation, the opposed walls of the parts 5a, 5b, being formed with separate alined related recesses which are later referred to.

The outer end portions of the opposed faces of the body parts 5a, 5b, are relieved from side to side thereof, as shown at 5x, 5x', so that when the body parts 5a, 5b, are secured together, as later set forth, these relieved portions provide a through channel 5' into which an intermediate portion of the main cable 1 is initially positioned and, as later set forth, moved into engagement with the bottom wall 5" of the channel, whereby the leads of the branch circuit is electrically connected to the wires 1x in the main cable 1. The outer end portion of the body part 5b is extended outwardly beyond the outer end portion of the body part 5a for a purpose later set forth.

The connections for connecting the parts 5a, 5b, together preferably consist of the following: 7, 7a, indicate alined through openings formed in the body parts 5a, 5b, and disposed at right angles to the longitudinal axis of the body member 5, the opposite outer ends of the openings being enlarged to form annular recesses 7b. 7c indicates a tubular member mounted in and extending through the openings 7, 7a, the opposite ends of the tubular member 7c being flanged outwardly into engagement with the bottom walls of the recesses 7b. As will be observed, the body parts 5a, 5b, are secured together after the electrical terminals or contact elements are positioned in one of the body parts 5a, 5b. Prior to such positioning the insulation of the branch circuit cable 2x is separated along a median line at a point remote from its free end to provide lead-in conductors 2x' and the insulation on the end portions of the latter is removed to provide terminals or contact elements 2c having terminating pointed ends 2d, each adapted to penetrate the cable insulation and one of the wires 1x and (by preference) extend through the latter, as shown in Fig. 4. By preference, each terminal 2d preferably consists of inner an douter endwise related sections 2e, 2e', respectively, in electrical contact, the inner end of the outer section having an annular shoulder 2e" and its outer end being pin-pointed. By preference, the section 2e has a diameter of approximately .0340 of an inch. 8 indicates a hollow member (which is formed of suitable conducting material, such as brass), the lower end of which is enlarged to provide upper and lower annular shoulders 8a and an enlarged interior opening 8b. The terminal or contact element 2c of each conductor 2x' is mounted in and extends through the hollow member 8. In the form of construction shown, the annular shoulder abuts the inner end wall of the opening 8b and the space in the opening 8b surrounding the terminal section 2c is filled with solder or other suitable material to secure the section 2e in the hollow member 8 and in electrical contact with the outer section 2e'. As will be observed, each lead-in conductor member, the adjacent terminal and hollow member 8 provide a sub-assembly for positioning in one of the body parts 5a, 5b.

Figures 3, 3A, 8:
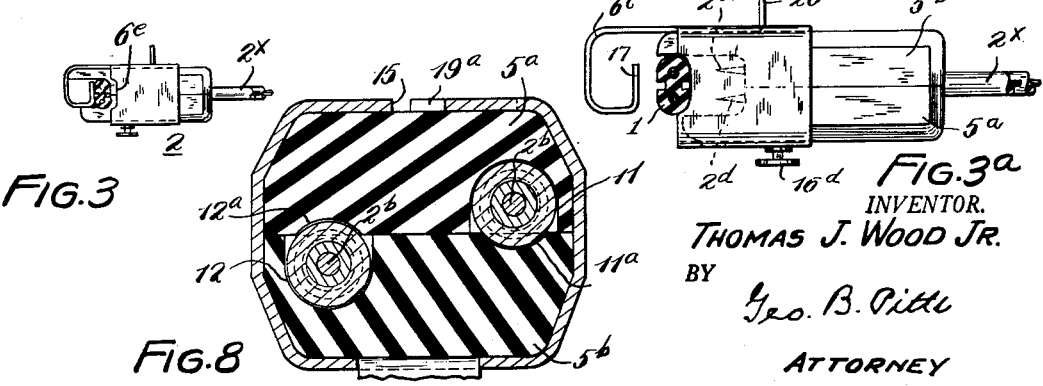
Fig. 3 is a section on the line 3—3 of Fig. 2.
Fig. 3a is a view similar to Fig. 3 (enlarged), but showing the operation of disconnecting the cable and the wires therein from the electrical terminals in the device.
Fig. 8 is a section on the line 8—8 of Fig. 4.

As will be observed in Figs. 7 and 8, the sub-assemblies are offset one relative to the other when positioned within the body parts 5a, 5b, whereby each terminal or contact element 2c will be alined with one of the wires 1x when the cable 1 is positioned in the channel 5'. To accommodate the sub-assemblies, the inner end walls of the body parts 5a, 5b, are formed with related recesses 9, 9a, forming an opening 9' communicating with an enlarged chamber 10 consisting of related recesses 10a, 10b, formed in the opposed faces of the parts 5a, 5b, and the latter chamber communicates with related laterally curved recesses 11, 11a, and contiguous outwardly extending recesses leading to and through the bottom wall of the channel 5'. As shown, (a) the cable 2x seats in and extends through the opening 9' into the chamber 10 and the sub-assemblies are seated in the recesses 11—11a, 12—12a, respectively. To mount the terminals or contact elements 2c in offset relation the recess 11 formed in the inner face of the body part 5a and the corresponding recess 12 formed in the inner face of the body part 5b are enlarged and have a shape in cross section complementary to the exterior walls of the hollow members 8 to secure the terminals 2c against endwise movement; (b) the laterally curved recesses 11, 11a, prevent the conductor members 2x' from being pulled out; and (c) when the sub-assemblies are seated, as above set forth, the terminating pointed ends of the terminals or contact elements extend beyond the bottom wall 5" of the channel 5', as shown in Figs. 4 and 5.

13 indicates a recess formed in the face of the body part 5b and alined endwise with a through opening 14 formed in the body part 5a, the outer end of the opening 14 being enlarged as shown at 14a, the recess 13 and opening 14 providing an inwardly extending chamber 14' for a purpose later set forth.

The member 6 consists of a section of relatively thin sheet metal and shaped to form a main portion 6a, slidably fitting the exterior walls of the body 5 for movement relative thereto, and an extension 6b in engagement with the rear side of the body 5. The upper end portion of the extension 6b is bent laterally inwardly and downwardly providing a top wall 6c and a side wall 6d, the latter wall being extended to provide an integral transversely disposed member 17 in alinement with the channel 5' and adapted to apply pressure to and move the cable 1 into engagement with the seat 5", when the member 6 is moved inwardly. As shown in Fig. 3a and in dotted lines in Fig. 5, when the member 6 is moved outwardly the channel 5' is open from end to end, whereupon the cable may be positioned in the channel 5' and upon movement of the member 6 inwardly the pressure member 17 engages with and moves the cable 1 into engagement with its seat 5", such movement serving to automatically project the contact elements 2d through the insulation of the cable 1 and effect electrical contact of the contact elements 2d with the wires 1x, respectively, to close the adjacent branch circuit 2', as shown in Figs. 2, 3, 4, 5, 6 and 7. Means are provided for releasably and automatically locking the pressure member 17 in its operative position; that is, with the contact elements of the branch circuit 2' electrically connected to the wires 1x. As shown, the opposite side walls of the member 6 (intermediate the front and rear walls of the latter) are formed with alined recesses 6e the bottom walls of which provide abutments for a purpose later set forth. The opposite ends of the metallic section, which forms the member 6, are cut away to provide therebetween an elongated, longitudinally extending slot 15, the upper end portion of which is enlarged as shown at 15a and adapted to aline with the opening 14 when the member 6 is in operative position. 16 indicates a pin or plunger mounted in the chamber 14' and provided with an inner annular shoulder 16a adapted to engage the inner marginal edge of the opening 15a to limit the outward movement of the pin or plunger 16, an outer annular shoulder 16b having a diameter less than that of the opening 15a and adapted to move inwardly and outwardly relative thereto, a reduced section 16c with which the side walls of the slot 15 slidably engage, during movement of the member 6 in either direction, and a head 16d on the outer end of the pin 16. 18 indicates a spring within the chamber 14' and coiled around the pin or plunger 16, the spring 18 bearing at its opposite ends on the bottom wall of the chamber 14' and shoulder 16a, for biasing the pin or plunger 16 outwardly. Also, as shown in Fig. 6, one marginal edge of the slot 15, adjacent its lower end is cut away as shown at 19, the lower side of which extends beyond its upper side to provide a stop 19a, which is arranged to engage the pin or plunger 16, to limit the outward movement of the member 6.

*Operation.*—With the member 6 in the position shown in Fig. 3a and in dotted lines in Fig. 5, the stop 19a is in engagement with the pin section 16c and the shoulder 16b is under spring pressure on the inner marginal edges of the slot 15. Upon movement of the member 6 inwardly to its operative position, as shown in Fig. 5, the opening 15a is alined with the chamber 14', whereupon the pin or plunger 16 is biased outwardly and automatically moving the shoulder 16b into the opening 15a, the engagement of the shoulder with the walls of the opening 15a serving to lock the member 6 against movement in either direction and hence maintaining an electrical connection between the wires 1x and contact elements 2d of the cable 2x. To release the member 6 and move the latter outwardly, the pin or plunger 16 is moved inwardly in opposition to the spring 18 to disengage the annular shoulder 16b from the walls of the opening 15a. In releasing the member 6 from the body 5, I provide on the rear wall of the member 6 a stamped-out lug 20, so that by using the thumb of a person's hand to press the pin 16 inwardly and simultaneously using a finger and pressing upwardly on the lug 20, operation of the member 6 outwardly is readily manually effected. In moving the member 6 outwardly the abutments 6e engage the cable 1 at opposite sides of the contact elements 2d and move it outwardly, whereby the cable wires 1x are automatically disconnected from the contact elements 2d and the branch circuit is detached from the cable 1.

As already set forth, the body part 5b extends upwardly beyond the upper end of the body part 5a to reinforce the extension 6b of the member 6 and prevent the extension 6b from being distorted and possible misplacement of the pressure member 17 with the result that the latter would be ineffective to insure electrical contact between both contact elements 2d and the respective wires 1x.

From the foregoing description it will be observed that I provide two main relatively movable members one of which is provided with a main cable receiving channel 5' and interiorly with the leads for a branch electric circuit, the terminating pointed ends of the leads projecting into the channel 5' and the other member being slidably related to the first member and operable (a) inwardly to move the cable 1 into engagement with the seat 5" to effect an electrical connection between the leads of the branch circuit and the wires in the main cable, respectively, and (b) outwardly to disengage the wires in the main cable from the branch circuit leads; also that means are provided for limiting the movement of the slidable member in either direction to prevent displacement thereof and for automatically releasably interlocking the members together when in the circuit for the branch circuit is connected to the circuit supply wires 1x of the main cable. This locking is important since the connection of the branch circuit with the main cable is not dependent upon the frictional engagement between any of the parts and permits the outer portions of the branch circuit cable 2x to be freely manipulated, moved or adjusted for connection to an electrically operated device. By employing terminating pin-pointed leads for the branch circuit, the devices 2 may be connected to the main cable at selected positions and detached therefrom without damaging the insulating material of the main cable.

What I claim is:

1. A device for electrically connecting a branch circuit to another circuit, said device comprising a body formed of non-conducting material and having an end shaped to provide a through channel adapted to receive a portion of a cable having current conductor wires therein, the bottom wall of said channel providing a seat for the cable, conductor members for a branch circuit mounted within said body and including leads having pointed terminating ends which are in offset relationship to each other and which extend outwardly beyond said seat into said channel, and a movable member supported on said body for movement in a direction transversely of said channel and provided with a pressure element disposed outwardly of said channel and adapted to engage a cable adjacent to the opening of the channel and move the cable into engagement with said seat upon movement of said movable member in a direction to move said pressure element inwardly of said channel, the pointed terminating ends of said leads being projected through the insulation of the cable and into electrical contact with the respective wires therein upon movement of the cable against said seat, said movable member being provided with an abutment disposed to engage the cable and move it away from said seat and disconnect said leads from said wires when said movable member is moved in a direction to move said pressure element outwardly of said channel.

2. A device for electrically connecting a branch circuit to another circuit, said device comprising a body formed of non-conducting material and having an end shaped to provide a through channel adapted to receive a portion of a cable having current conductor wires therein, the bottom wall of said channel providing a seat for the cable, conductor members for a branch circuit mounted within said body and including leads having pointed terminating ends which are in offset relationship to each other and which extend outwardly beyond said seat into said channel, a movable member support on said body for reciprocable movement in a direction transversely of said channel and provided with a pressure element disposed outwardly of said channel and adapted to engage a cable adjacent to the opening of the channel and move the cable into engagement with said seat upon movement of said movable member in a direction to move said pressure element inwardly of said channel, the pointed terminating ends of said leads being projected through the insulation of the cable and into electrical contact with the respective wires therein upon movement of the cable against said seat, and means connected between said body and said movable member to limit the movement of the said movable member in either of its direction.

3. A device for electrically connecting a branch circuit to another circuit, said device comprising a body formed of non-conducting material and having an end shaped to provide a through channel adapted to receive a portion of a cable having current conductor wires therein, the bottom wall of said channel providing a seat for the cable, conductor members for a branch circuit mounted within said body and including leads having pointed terminating ends which are in offset relationship to each other and which extend outwardly beyond said seat into said channel, a movable member supported on said body for reciprocable movement in a direction transversely of said channel and provided with a pressure element disposed outwardly of said channel and adapted to engage a cable adjacent to the opening of the channel and move the cable into engagement with said seat upon movement of said movable member in a direction to move said pressure element inwardly of said channel, the pointed terminating ends of said leads being projected through the insulation of the cable and into electrical contact with the respective wires therein upon movement of the cable against said seat, and means connected between said body and said movable member to limit the movement of the latter in either direction, the last-said means comprising a pin projecting outwardly from a wall of said body adjacent to said movable member and said movable member having a slot therein elongated in a direction parallel to the direction of movement of said movable member, said slot receiving said pin and the engagement of the end walls of said slot with said pin operating to limit the movement of said member.

4. A device for electrically connecting a branch circuit to another circuit, said device comprising a body formed of non-conducting material and having an end shaped to provide a through channel adapted to receive a portion of a cable having current conductor wires therein, the bottom wall of said channel providing a seat for the cable, electrical conductors for a branch circuit mounted within said body, said conductors including leads offset from each other and having pointed terminating ends which extend outwardly from said seat into said channel, a member movably fitting said body and having an endwise related extension extending outwardly from one end thereof, the outer end portion of said extension forming a pressure element disposed in alinement with said channel and disposed to engage the cable in said channel and move the latter into engagement with said seat upon movement of said member in a direction to move said pressure element inwardly of said channel, the terminating ends of said leads being projected through the insulation of the cable and into electrical contact with the respective wires therein upon the seating of said cable and said member being provided with abutment means disposed to engage the cable and move the latter outwardly relative to said seat to disconnect the cable from said leads upon movement of said member in a direction to move said pressure element outwardly of said channel.

5. A device for electrically connecting a branch circuit to another circuit, said device comprising a body formed of non-conducting material and having an outer end shaped to provide a through channel adapted to receive a portion of a cable having current supply wires therein, the bottom wall of said channel forming a seat for the cable, branch circuit conductors having inner ends which are mounted within said body and offset leads connected to said conductors respectively and having pointed terminating ends which extend through said seat and outwardly therefrom into said channel, a slide member having an extension extending beyond said outer end of said body, a pressure member carried by the outer end of said extension and disposed in alined relationship with said channel, means for slidably supporting said slide member on said body for movement in a direction to reciprocate said pressure member toward and from said channel, said pressure member engaging the cable to move the leads into engagement with said seat when the slidable member is moved in a direction to move said pressure member inwardly of said channel and the terminating ends of said leads being projected through the insulation of the cable to effect electrical contact of said leads with respective wires within the cable upon seating of the cable, a pin mounted for endwise movement in a recess formed in said body and having a shoulder on its outer end portion, a spring in said recess for biasing said pin outwardly with respect to said recess, said slide member having a slot elongated in the direction of reciprocation of said member and enlarged at the end thereof which leads the slot when the member is reciprocated in the direction to move the pressure member outwardly from said channel, the enlarged end portion of said slot being adapted to pass said shoulder and said pin when the latter is in alinement therewith, said shoulder bearing on the inner marginal edges of said slot and said spring projecting said pin and said shoulder outwardly into the enlarged portion of said slot upon movement of the enlarged portion into alinement with said shoulder thereby locking the slide member against movement.

6. A device for electrically connecting a branch circuit to another circuit, said device comprising a body formed of non-conducting material and having an end shaped to provide a through channel adapted to receive a portion of a cable having current conductor wires therein, the bottom wall of said channel providing a seat for the cable, conductor members for a branch circuit mounted within said body and including leads having pointed terminating ends which are in offset relationship to each other and which extend outwardly beyond said seat into said channel, and a movable member supported on said body for reciprocable movement in a direction transversely of said channel and provided with a pressure element disposed outwardly of said channel and adapted to engage a cable adjacent to the opening of the channel and move the cable into engagement with said seat upon movement of said movable member in a direction to move said pressure element inwardly of said channel, the pointed terminating ends of said leads being projected through the insulation of the cable and into electrical contact with the respective wires therein upon movement of the cable against said seat, a pin mounted on said body and projecting outwardly from one side thereof through a slot in the adjacent wall of said movable member, said slot being elongated parallel to the direction of movement of said movable member and one end of said slot serving to limit the movement of said movable member in the direction to move said pressure member toward said channel and a stop adjacent the other end of said slot to limit the movement of said movable member in its other direction.

7. A device for electrically connecting a branch circuit to another circuit, said device comprising a body formed of non-conducting material and having an end shaped to provide a through channel adapted to receive a portion of a cable having current conductor wires therein, the bottom wall of said channel providing a seat for the cable, conductor members for a branch circuit mounted within said body and including leads having pointed terminating ends which are in offset relationship to each other and which extend outwardly beyond said seat into said channel, a movable member movably supported on said body and provided with a pressure element disposed outwardly of said channel and adapted to engage a cable adjacent to the opening of the channel and move the cable into engagement with said seat upon movement of said movable member in a direction to move said pressure element inwardly of said channel, the pointed terminating ends of said leads being projected through the insulation of the cable and into electrical contact with the respective wires therein upon movement of the cable against said seat, and means between said body and said movable member for automatically locking said movable member upon movement of the movable member in a direction to move the pressure element inwardly of the channel to a cable seated position.

References Cited in the file of this patent

UNITED STATES PATENTS

| 1,144,224 | Mills | June 22, 1915 |
| 1,315,317 | Letiecq | Sept. 9, 1919 |
| 2,110,513 | Toelke | Mar. 8, 1938 |
| 2,559,706 | Brooks | July 10, 1951 |
| 2,567,783 | Richardson | Sept. 11, 1951 |
| 2,657,367 | Brooks | Oct. 27, 1953 |